United States Patent [19]

Antonious

[11] E Patent Number: Re. 32,585

[45] Reissued Date of Patent: Feb. 2, 1988

[54] ADJUSTABLE AND FLEXIBLE CLOSURE ASSEMBLY FOR SHOES WITH VARIABLE OPENING

[76] Inventor: Anthony J. Antonious, 205 East Joppa Rd., Unit 1603, Towson, Md. 21204

[21] Appl. No.: 567,398

[22] Filed: Dec. 30, 1983

Related U.S. Patent Documents

Reissue of:

[64] Patent No.: 4,308,672
Issued: Jan. 5, 1982
Appl. No.: 21,009
Filed: Mar. 16, 1979

[51] Int. Cl.[4] ..... A43B 11/00; A43C 11/00

[52] U.S. Cl. ..... 36/50; 36/114; 24/306

[58] Field of Search ..... 36/50, 51, 54, 114, 36/129; 2/DIG. 6; 24/306, 442, 445

[56] References Cited

U.S. PATENT DOCUMENTS

| | | | |
|---|---|---|---|
| 669,417 | 3/1901 | Klett | 36/50 X |
| 913,012 | 2/1909 | Jackson . | |
| 1,763,997 | 6/1930 | Williams | 36/50 X |
| 1,933,467 | 10/1933 | Yartyan . | |
| 2,022,554 | 11/1935 | Williams . | |
| 2,082,537 | 6/1937 | Butler . | |
| 2,773,316 | 12/1956 | Clappier | 36/129 |
| 2,935,798 | 5/1960 | Piberhofer . | |
| 2,994,972 | 8/1961 | Blair . | |
| 3,009,221 | 11/1961 | Firari . | |
| 3,037,303 | 6/1962 | Steuer . | |
| 3,106,790 | 10/1963 | Zimmon . | |
| 3,205,544 | 9/1965 | Streule et al. | 24/306 |
| 3,327,410 | 6/1967 | Park, Sr. et al. . | |
| 3,372,438 | 3/1968 | Rinecker . | |
| 3,407,450 | 10/1968 | Baso . | |
| 3,464,125 | 9/1969 | Conway . | |
| 3,618,235 | 11/1971 | Cary . | |
| 3,626,610 | 12/1971 | Dassler . | |
| 3,827,107 | 8/1974 | Moore | 24/16 R |
| 3,845,769 | 11/1974 | Shaw . | |
| 3,902,229 | 9/1975 | Doerpinghaus . | |
| 3,943,981 | 3/1976 | De Brabander | 2/DIG. 6 |
| 4,079,527 | 3/1978 | Antonious | 36/51 |
| 4,081,916 | 4/1978 | Salisbury . | |
| 4,114,297 | 9/1978 | Famolare, Jr. | 36/50 |

FOREIGN PATENT DOCUMENTS

| | | | |
|---|---|---|---|
| 1452 | of 1927 | Australia . | |
| 242557 | 9/1965 | Austria . | |
| 935640 | 10/1973 | Canada | 36/50 |
| 124925 | 11/1901 | Fed. Rep. of Germany . | |
| 147938 | 1/1904 | Fed. Rep. of Germany . | |
| 173924 | 9/1906 | Fed. Rep. of Germany . | |
| 918250 | 9/1954 | Fed. Rep. of Germany | 36/129 |
| 2319887 | 11/1973 | Fed. Rep. of Germany . | |
| 579941 | 8/1924 | France . | |
| 1380027 | 10/1964 | France . | |
| 1471601 | 1/1967 | France . | |
| 2271782 | 12/1975 | France | 24/442 |
| 2375841 | 7/1978 | France | 36/50 |
| 430494 | 8/1967 | Switzerland | 36/50 |
| 220141 | 8/1924 | United Kingdom . | |
| 1043723 | 9/1966 | United Kingdom . | |

OTHER PUBLICATIONS

Velcro Product News, Jul. 1977, PN No. 35, Velcro USA Inc.

(List continued on next page.)

*Primary Examiner*—James Kee Chi
*Attorney, Agent, or Firm*—Finnegan, Henderson, Farabow, Garrett & Dunner

[57] ABSTRACT

A shoe having a variable opening and tongue utilizing an adjustable and flexible closure assembly which includes separable fastening members having coacting, flexible, gripping elements, such as hook and loop Velcro type fastening means, a fastener strap, and an anchor means with an opening to engage the free end of the fastener strap permitting the wearer to easily adjust and secure the closure assembly to the precise tautness desired, using only one hand.

54 Claims, 15 Drawing Figures

OTHER PUBLICATIONS

Velcro Product News, May, 1978, PN No. 45, Velcro USA Inc.

Velcro D-Ring, Velcro Corp. Inc., Approx. date 1962.

Puma catalogs and brochures, 1971-1972.

Sports Beconta catalog bearing the printed dates 1971 and 1972.

Sports Beconta catalog a printed date 1973 and catalog No. 58.

Sports Beconta catalog bearing a copyright date of 1972 and catalog No. 54.

Puma 71 catalog.

Puma 72 catalog.

Puma Sur Tous Les Stades Du Punch En Plus catalog.

Proven Velcro Applications on Footwear, Velcro Corporation, approx. date 1962.

Technical Notes from the Artificial Limb Program, reprinted from Artificial Limbs, vol. 6, No. 1, Apr. 1961, pp. 102-103.

Velcro D-Rings, Velcro Corporation, approx. date 1962, P.R.N. #1148, 12/4/72, Bauer.

FIG. 8.
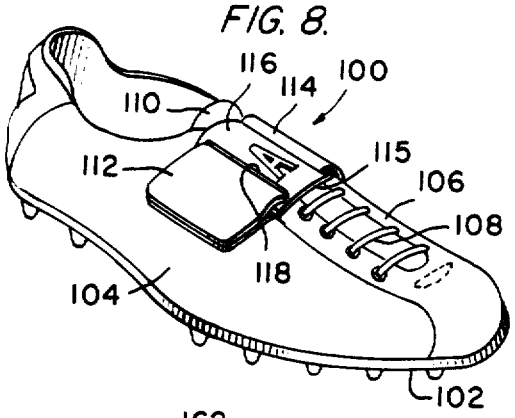
FIG. 9.
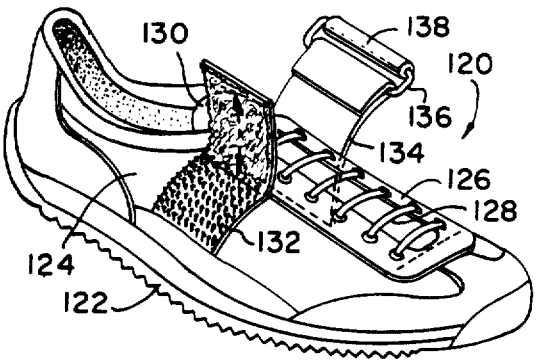
FIG. 10.
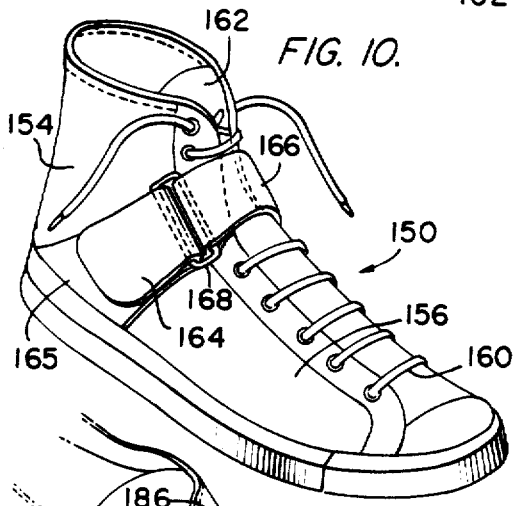
FIG. 11.
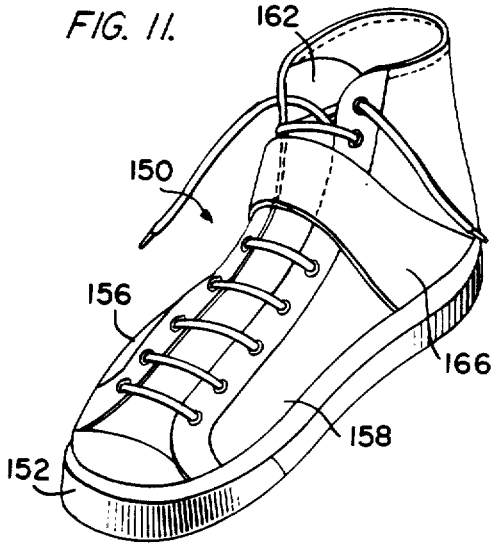
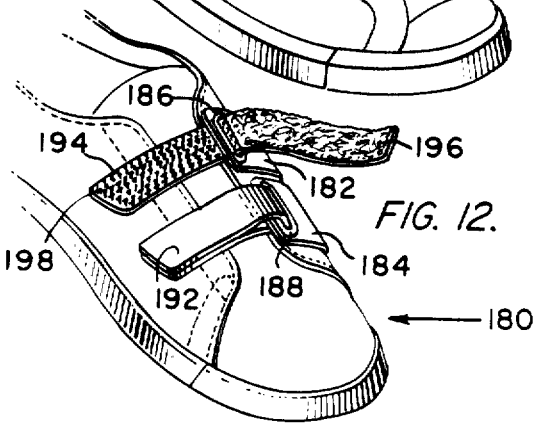
FIG. 12.
FIG. 13.
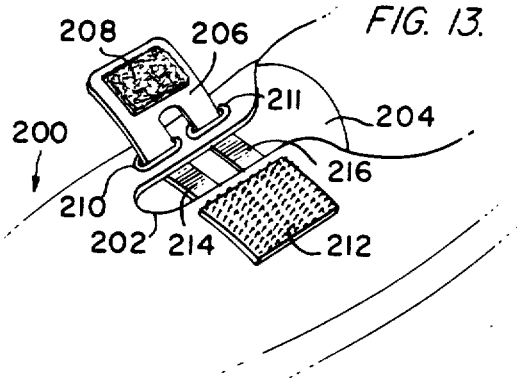
FIG. 14.
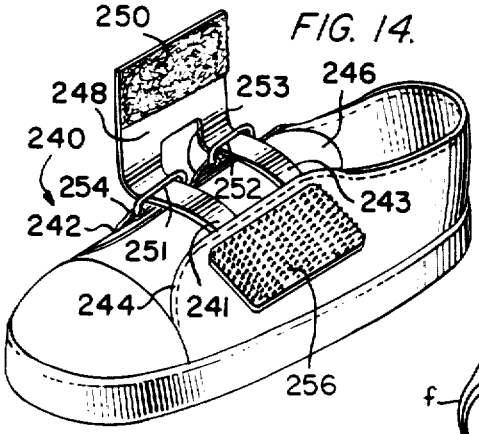
FIG. 15.
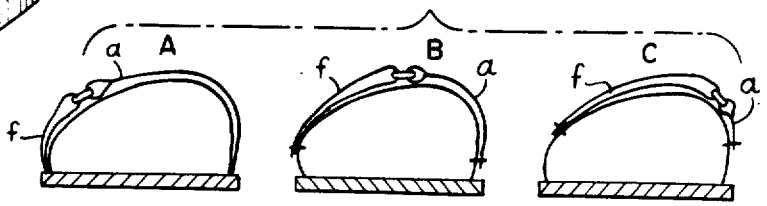

ADJUSTABLE AND FLEXIBLE CLOSURE ASSEMBLY FOR SHOES WITH VARIABLE OPENING

Matter enclosed in heavy brackets [ ] appears in the original patent but forms no part of this reissue specification; matter printed in italics indicates the additions made by reissue.

FIELD OF THE INVENTION

This invention pertains to shoes, particularly the types of shoes suited for various athletic sports, such as running, tennis, soccer, basketball and jogging. However, it is also adaptable for dress shoes, golf shoes, football shoes, work shoes, outdoor shoes and other footwear.

BACKGROUND OF THE INVENTION

The present invention relates to improvements in shoe construction utilizing an adjustable and flexible closure assembly to secure the shoe to the wearer's foot. In order to maintain the best fit and most comfort when wearing shoes using laces, it is necessary to retie them frequently because they become untied or loosen from the constant exertion of force against them. Shoes with buckles offer only a limited adjustability as permitted by the fixed spacing of holes in the strap for insertion of the rigid metal stud/latch on a buckle.

One of the major disadvantages in using laces is that when they become loose or break, the wearer can experience discomfort or even injury. This can happen especially in a fastaction sport requiring quick foot movements, such as basketball, tennis, racquetball, soccer, football and the like.

SUMMARY OF THE INVENTION

Shoes of the present invention pertain to low-cut and high-cut shoes, particularly sports shoes, which include an adjustable and flexible closure assembly to secure the shoe on the wearer's foot. The improvement of this invention can eliminate some of the problems found in conventional shoes which use laces only or buckles and similar fastening devices. The closure assembly can either totally or partially eliminate laces, buckles and other rigid fasteners as the fastening means for shoes. Whereas shoes using laces or buckles require both hands to fasten the shoe, the present invention enables the wearer to quickly adjust and firmly maintain the precise tautness desired by easily pulling the shoe uppers simultaneously to fasten the shoe, using only one hand. Most importantly, since the closure assembly of this invention can be easily manipulated using only one hand, no great dexterity is required to complete the fastening to firmly secure the shoe to the foot. Children and handicapped persons will also benefit from this improvement because they can fasten their shoes easily and quickly.

The closure assembly of the present invention includes co-acting hook and loop Velcro type fastening means, a fastener strap and an anchor means. The fastener strap has a fixed end permanently attached to one side of the shoe and a free end including at least one co-acting member of hook and loop fastening means. The anchor means or anchor strap has one end permanently attached to the opposite side of the shoe and a free end with an opening through which the free end of the fastener strap passes to fasten the shoe.

The improvement of this invention also includes a non-retractable U-type fastener strap bifurcated to form two members at the fixed end and a single member at the free end. The bifurcated members pass through separate openings on the side of the shoe forming the anchoring means and are attached adjacent the variable opening on the opposite side of the shoe. The hook and loop fastening means for the U-type fastener strap may be utilized in the same manner as the fastening means described hereinabove. The U-type fastener strap cannot be withdrawn after the two straps are inserted through the individual openings and attached to the shoe.

Among the objects of the present invention is the provision of a shoe having an adjustable and flexible closure assembly utilizing hook and loop fastening means which permits the wearer to adjust and maintain the precise desired tautness thereby obtaining a custom-fit and more comfort to the wearer's foot.

BRIEF DESCRIPTION OF THE DRAWINGS

FIG. 8 is a perspective view of a fourth embodiment of the shoe of the present invention.

FIG. 9 is a perspective view of a fifth embodiment of the shoe of the present invention.

FIG. 10 is a perspective view of a sixth embodiment of the shoe of the present invention.

FIG. 11 is another view of the shoe of FIG. 10.

FIG. 12 is a partial perspective view of a seventh embodiment of the shoe of the present invention.

FIG. 13 is a partial perspective view of an eighth embodiment of the shoe of the present invention.

FIG. 14 is a perspective view of a ninth embodiment of the shoe of the present invention.

FIG. 15 is a side sectional view of a shoe of the present invention showing various arrangements of the strap used with the closure assembly of the present invention.

DESCRIPTION OF THE PREFERRED EMBODIMENTS

Figure 1:
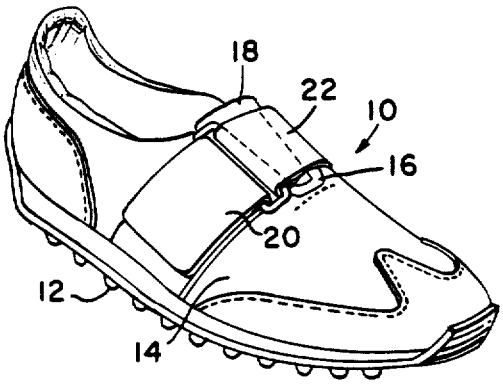
FIG. 1 is a perspective view of a first embodiment of the present invention showing the closure assembly in the closed position.
Figure 2:
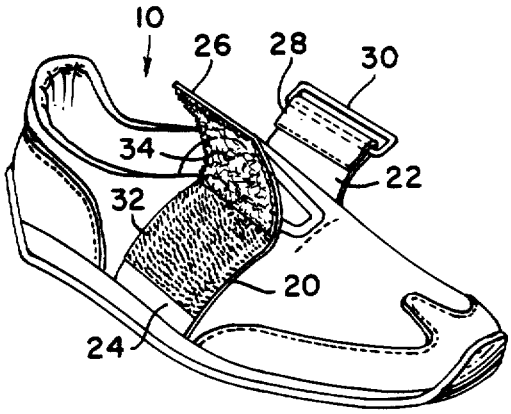
FIG. 2 is a perspective view of the shoe of FIG. 1 showing the closure assembly in the open position.

FIGS. 1 and 2 show an athletic shoe 10 of the present invention. The shoe 10 is shown as a running-type shoe formed of a sole 12 and uppers 14 having a variable V throat instep opening 16 and a tongue 18. The shoe 10 is provided with an adjustable and flexible closure assembly which is secured across the shoe opening 16 and includes a fastener strap 20 secured to one side of the shoe 10 and an anchor strap 22 secured on the opposite side of the opening 16 of the shoe 10. The anchor strap 22 includes a free end 28 having a D-ring 30 which forms an opening through which the free end 26 of the fastener strap 20 passes to secure the closure assembly. The fastener strap 20 utilizes a flexible, multi-adjustable, separable fastener having first and second fastening members including an array of complementary, coacting, flexible gripping elements on each of the members, such as a Velcro-type co-acting hook and loop fastening means including a pad of hook fastening material 32 positioned on the fixed end 24 of the fastener strap 20 and a pad 34 of loop fastening material positioned on the free end 26 of the fastener strap 20.

In use, the variable opening 16 expands in order to accommodate the wearer's foot as he inserts it into the shoe. The free end 26 of the fastener strap 20 is passed through the D-ring 30 on the anchor strap 22. The wearer brings the shoe uppers inwardly by pulling the fastener strap 20 until the precise desired tautness is achieved. The loop fastening means 34 at the free end 26 of the fastener strap 20 is placed to co-act with the hook fastening means 32 at its fixed end 24 to secure the shoe.

Figure 3:
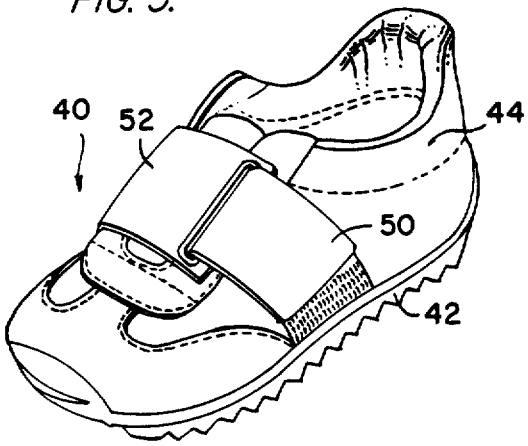
FIG. 3 is a perspective view of a second embodiment of the shoe of the present invention showing the closure assembly in the closed position.
Figure 4:
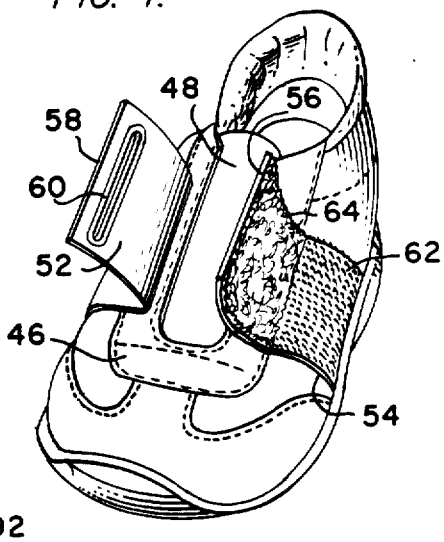
FIG. 4 is a view of the shoe of FIG. 3 showing the closure assembly in the open position.

FIGS. 3 and 4 show a second embodiment of a shoe 40 of the present invention. The shoe 40 is a child's shoe including a sole 42 and uppers 44 and it includes a U-throat variable opening 46 and tongue 48. The shoe is provided with an adjustable and flexible closure assembly, including a fastener strap 50 secured to one side of the shoe and an anchor strap 52 secured to the opposite side of the shoe, across the variable opening 46. The fastener strap 50 includes a fixed end 54 and a free end 56 and the anchor strap 52 includes a free end 58 having a grommet 60 adapted to receive the free end 56 of the fastener strap 50. The fastener strap 50 is provided with a hook and loop Velcro type fastening means including a pad of hook fastening material 62 on the fixed end 54 of the strap fastener 50 and a pad of co-acting loop material 64 on the free end 56 of the fastener strap 50.

The shoe is secured in basically the same manner as the shoe described with respect to FIGS. 1 and 2; that is, the free end 56 of the fastener strap 50 is passed through the grommet 60 and folded back to secure the hook and loop fastening means when the precise desired tautness is achieved. This arrangement is particularly useful in children's shoes since only one hand is required to secure the closure assembly once the fastener strap 50 is passed through the grommet 60 in the anchor strap 52.

Figure 5:
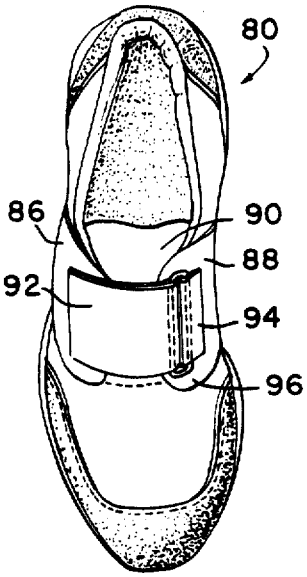
FIG. 5 is a plan view of a third embodiment of the shoe of the present invention.
Figure 6:
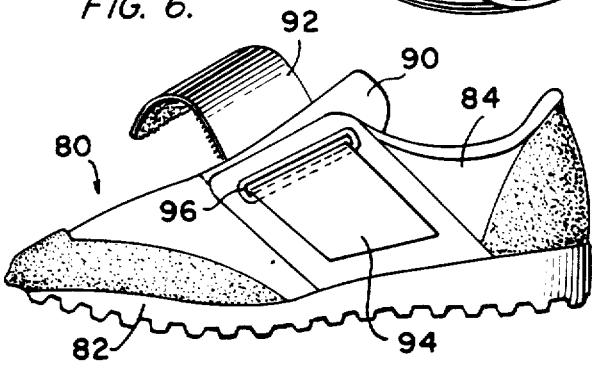
FIG. 6 is a side elevational view of the shoe of FIG. 5.
Figure 7:
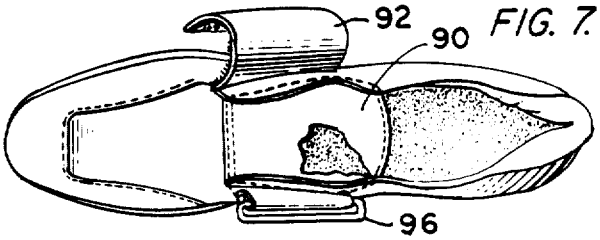
FIG. 7 is a plan view of the shoe of FIG. 5 showing the closure assembly in the open position.

FIGS. 5, 6 and 7 show a third embodiment of a shoe 80 of the present invention which is a blucher-type of athletic shoe including a sole 82 and uppers 84 and having a variable opening formed by quarters 86 and 88 and a tongue 90. The shoe is also provided with an adjustable and flexible closure assembly of the same type as described with reference to FIGS. 1 and 2 including a fastener strap 92 having a hook and loop Velcro-type fastening means integrally attached thereto and an anchor means 94 including a D-ring 96 which receives the fastener strap 92.

FIG. 8 illustrates a fourth embodiment of a shoe 100 of the present invention. The shoe is shown as a soccer or football type shoe including a sole 102 and uppers 104 and a variable opening with a vamp 106 having laces 108 and a tongue 110. The shoe 100 includes an adjustable and flexible closure assembly which overlays the upper portion of the laces 108 and further secures the shoe and includes a fastener strap 112, an anchor strap 114 securing a connector plate 116 through an opening 115 and having another opening 118 through which the fastener strap is passed and the closure assembly secured using a hook and loop Velcro-type fastening means in the same manner as described with reference to the above figures.

FIG. 9 shows a fifth embodiment of the present invention. A low-cut basketball or tennis-type shoe 120 includes a sole 122 and uppers 124 and a variable opening with a U-throat vamp 126, laces 128 and a tongue 130. The shoe includes a fastener strap 132 made of co-acting elasticized hook and loop Velcro type material. An anchor strap 134 includes a D-ring 136 having a roll bar 138 which allows the fastener strap 132 to glide smoothly to secure the closure assembly.

FIGS. 10 and 11 show another embodiment of the present invention in the form of a high-cut basketball-type shoe 150 including a sole 152 and uppers 154. The shoe includes a variable opening and quarters 156 and 158, laces 160 and a tongue 162. The shoe 150 is provided with an adjustable and flexible closure assembly including a fastener strap 164 and an anchor strap 166 of the same type as described hereinabove. The fastener strap 164 includes a fixed end 165 attached to shoe 150 where sole 152 and uppers 154 adjoin and a free end having hook or loop Velcro-type fastening means and the anchor strap 166 includes a D-ring 168 through which the fastener strap 164 passes. The closure assembly is positioned further back and higher up on the instep of the shoe to provide greater security at the ankle area of the wearer's foot. The closure assembly in all other respects is essentially the same as that shown in FIGS. 1 and 2 and is secured in the same manner as described therewith.

FIG. 12 illustrates a low-cut athletic type shoe 180 having two adjustable and flexible closure assemblies of the same type as described with reference to FIG. 3 including anchor straps 182 and 184 with grommets 186 and 188 which form the openings to receive the fastener straps 194 and 192. Each of the fastener straps 194 and 192 utilize a Velcro-type hook and loop fastening means including a pad 196 of loop type material and a pad 198 of hook type material which are secured in the same as described hereinabove.

FIG. 13 shows another shoe 200 having a U-throat variable opening 202 and tongue 204. The shoe 200 includes an adjustable and flexible closure assembly utilizing a bifurcated fastener strap 206 including a body portion having a pad 208 of loop Velcro-type material secured adjacent its free end and leg members with fixed ends 214 and 216 attached adjacent the variable opening 202 on one side of the shoe. The leg members of the bifurcated fastener strap 206 pass through and are retained by grommets 210 and 211 forming openings on the opposite side of the variable opening 202. A separate pad 212 of hook Velcro-type material is attached adjacent the edge of the variable opening 202 to which the fixed bifurcated members 214 and 216 of the fastener strap 206 are attached. The pad 212 of hook Velcro-type material coacts with pad 208 of loop Velcro-type material at the one end of fastener strap 206 to secure the closure assembly after the precise desired tautness is achieved.

FIG. 14 shows still another embodiment of the present invention. A low-cut athletic type shoe 240 having a variable opening and quarters 242 and 244 and a tongue 246 is provided with an adjustable and flexible closure assembly utilizing a bifurcated fastener strap 248, the free end of which is provided with a pad of loop Velcro-type fastening material 250. Each member 241 and 243 of the bifurcated fastener strap 248 passes through D-rings 251 and 252 respectively formed on anchor straps 253 and 254. A pad hook Velcro-type material 256 is provided on the opposite side of the shoe and is adapted to coact with pad 250 of loop Velcro-type material to secure the closure assembly.

The bifurcated fastener strap shown in FIGS. 13 and 14 has the advantage of always being retained by the opening in the anchor means so that it is not necessary to reinsert the fastener strap of the closure assembly each time a shoe is put on the wearer'foot. This is particularly useful for handicapped persons or for small children.

FIG. 15 illustrates various arrangements where the fixed ends of the fastener and anchor straps are secured to the shoe and the location where the free ends of the straps engage to fasten. FIG. 15a shows a fastener strap f, the fixed end of which is secured at the junction of the sole of the shoe and the shoe upper and which does not extend passed the side of the shoe to which it is secured. The anchor strap a is also secured at the junction of the sole and the shoe upper on the other side of the shoe and extends over the shoe to the side where the fastener strap is located to secure the closure assembly. FIG. 15b illustrates an arrangement where the fastener strap f is attached above the sole of the shoe and extends partway over the shoe. The anchor strap a is also attached above the sole of the shoe and extends over the shoe to engage the fastener strap. FIG. 15c illustrates a closure arrangement wherein a fastener strap f is secured above the sole and extends over the shoe to the opposite side. An anchor strap a is secured above the shoe sole but remains on that side of the shoe to engage the fastener strap.

These various arrangements in length and location of both the fastener strap and the anchor strap are interchangeable and may be used on any of the embodiments shown in this application as long as the arrangement is consistent with that particular style of shoe. As shown in FIGS. 15b and 15c, the strap may be secured at a point relatively near the sole of the shoe, FIG. 15b, or at a point well up on the shoe uppers, FIG. 15c.

It will be appreciated various modifications may be made in the present invention. As indicated above, any suitable separable fastener including first and second fastening members having complementary, coacting, flexible gripping elements may be used in place of the hook and loop fastening means. Other changes may be made, for example, the closure assembly may be placed on either side of the shoe and the Velcro fastening means and cooperating opening are interchangeable or multiple closure assemblies may be used. Also, the invention works equally well whether the opening is a D-ring, grommet or connector plate or any other type of opening, and these are also readily interchangeable on the various embodiments of shoes contemplated by the present invention.

What is claimed is:

[1. A shoe having a sole, uppers and a variable instep opening in combination with an adjustable and flexible closure assembly spanning said variable instep opening, said closure assembly comprising:

a flexible, multi-adjustable, separable fastener means having first and second fastening members including arrays of complementary, coacting flexible gripping elements for securing said closure assembly;

a fastener strap included on one side of said shoe having a fixed portion and a free end, said free end including said first fastening member, said second fastening member positioned adjacent said fixed portion of said fastener strap; and anchor means on the opposite side of said shoe, said anchor means having an opening through which said free end of said fastener strap passes permitting adjustment to maintain a precise desired tautness of said closure assembly to fasten said shoe.]

2. The shoe of claim [1] *29* wherein said arrays of complementary, coacting flexible gripping elements include an array of hook type gripping elements on said first fastening member and an array of loop type gripping elements on said second fastening member.

[3. The shoe of claim 1 wherein said anchor means opening is formed of a D-ring.]

4. The shoe of claim [1] *29* wherein said [anchor means] opening is formed of a grommet.

[5. The shoe of claim 1 wherein said anchor means opening is formed of a connector plate.]

6. The shoe of claim [3] *25* wherein said D-ring is provided with a roll bar.

[7. The shoe of claim 1 wherein said anchor means forms a strap having a fixed end and a free end, said free end including said anchor opening.]

8. The shoe of claim [1] *29* wherein said fastener strap is made of elasticized material.

9. The shoe of claim [1] *29* wherein said uppers include quarters defining said variable instep opening and said closure assembly is connected to said quarters spanning said variable instep opening.

10. The shoe of claim [1] *29* wherein said uppers includes a vamp defining said variable instep opening and said closure assembly is connected to said vamp spanning said variable instep opening.

11. The shoe of claim [1] *29* wherein said vamp further includes a U-throat member further defining said variable instep opening.

12. The shoe of claim [1] *29* wherein said vamp further includes a V-throat member further defining said variable instep opening.

13. The shoe of claim [7] *27* wherein said fastener and said anchor straps are connected to the shoe at the junction of the sole and uppers adjacent the heel area of said uppers.

14. The shoe of claim [1] *29* further including a second adjustable and flexible closure assembly spanning said variable instep opening.

[15. The shoe of claim 1 wherein said fastener strap is bifurcated forming two leg members fixed to one side of the shoe and a body member portion spanning said leg members permanently retaining said leg members in said anchor means on the opposite side of said shoe.]

16. The shoe of claim [15] *28* wherein said body portion of said bifurcated fastener strap is free and includes a pad of hook and loop fastening material.

17. The shoe of claim 16 [further including] *wherein said second fastening member includes* a separate pad of hook and loop fastening material which coacts with said pad on said bifurcated fastener strap.

18. The shoe of claim [7] *27* wherein said fastener strap crosses said shoe to engage said anchor strap on the opposite side of said shoe.

19. The shoe of claim [7] *27* wherein said anchor strap crosses said shoe to engage said fastener strap on the opposite side of said shoe.

20. The shoe of claim 10 wherein said fastener strap and said anchor strap extend to engage between said shoe uppers.

21. The shoe of claim [1] *29* wherein said fixed end of said fastener strap is connected at the point where said sole and uppers join.

22. The shoe of claim [7] *27* wherein said fixed end of said fastener strap is connected to said uppers above said sole.

23. The shoe of claim [7] *27* wherein said anchor strap is connected at the point where said sole and said uppers join.

24. The shoe of claim [7] *27* wherein said anchor strap is connected to said uppers above said sole.

*25. A shoe having a sole, uppers and a variable instep opening in combination with an adjustable and flexible closure assembly spanning said variable instep opening, said closure assembly comprising:*

*a flexible, multi-adjustable, separable fastener means having first and second fastening members including arrays of complementary, coacting flexible gripping elements for securing said closure assembly;*

*a fastener strap included on one side of said shoe having a fixed portion and a free end, said free end including said first fastening member, said second fastening member positioned adjacent said fixed portion of said fastener strap; and*

*anchor means on the opposite side of said shoe, said anchor means having an opening formed of a D-ring through which said free end of said fastener strap passes permitting adjustment to maintain a precise desired tautness of said closure assembly to fasten said shoe.*

*26. A shoe having a sole, uppers and a variable instep opening in combination with an adjustable and flexible closure assembly spanning said variable instep opening, said closure assembly comprising:*

*a flexible, multi-adjustable, separable fastener means having first and second fastening members including arrays of complementary, coacting flexible gripping elements for securing said closure assembly;*

*a fastener strap included on one side of said shoe having a fixed portion and a free end, said free end including said first fastening member, said second fastening member positioned adjacent said fixed portion of said fastener strap; and*

*anchor means on the opposite side of said shoe, said anchor means having an opening formed of a connector plate through which said free end of said fastener strap passes permitting adjustment to maintain a precise desired tautness of said closure assembly to fasten said shoe.*

*27. A shoe having a sole, uppers and a variable instep opening in combination with an adjustable and flexible closure assembly spanning said variable instep opening, said closure assembly comprising:*

*a flexible, multi-adjustable, separable fastener means having first and second fastening members including arrays of complementary, coacting flexible gripping elements for securing said closure assembly;*

*a fastener strap included on one side of said shoe having a fixed portion and a free end, said free end including said first fastening member, said second fastening member positioned adjacent said fixed portion of said fastener strap; and*

*anchor means on the opposite side of said shoe, said anchor means having an opening through which said free end of said fastener strap passes permitting adjustment to maintain a precise desired tautness of said closure assembly to fasten said shoe, said anchor means forming a strap having a fixed end and a free end, said free end including said anchor opening.*

*28. A shoe having a sole, uppers and a variable instep opening in combination with an adjustable and flexible closure assembly spanning said variable instep opening, said closure assembly comprising:*

*a flexible, multi-adjustable, separable fastener means having a first and second fastening members including arrays of complementary, coacting flexible gripping elements for securing said closure assembly;*

*a bifurcated fastener strap included on one side of said shoe having a fixed portion and a free end, said free end including said first fastening member, said second fastening member positioned adjacent said fixed portion of said fastener strap, said bifurcated fastener strap forming two leg members fixed to one side of the shoe and a body member portion spanning said leg members permanently retaining said leg members in an anchor means on the opposite side of said shoe; and*

*anchor means on the opposite side of said shoe, said anchor means having an opening through which said free end of said fastener strap passes permitting adjustment to maintain a precise desired tautness of said closure assembly to fasten such shoe.*

*29. A shoe having a sole, uppers and a variable instep opening in combination with an adjustable and flexible closure assembly to span and close the variable instep opening, said closure assembly comprising:*

*a flexible, multi-adjustable, separable fastener means having first and second fastening members each including arrays of complementary, coacting flexible gripping elements for securing said closure assembly;*

*a fastener strap having a free end and a fixed portion permanently attached to the shoe and positioned at one side of the variable instep opening, said first fastening member being fixed to said free end of said fastener strap, said second fastening member being in alignment with said fastener strap and being fixed adjacent to said fixed portion of said fastener strap;*

*an anchor strap having a free end and a fixed portion permanently attached to the shoe and positioned at the opposite side of the variable instep opening, said free end of said anchor strap including an opening through which said free end of said fastener strap passes to adjust and close the variable instep opening; and*

*said closure assembly spanning the variable instep opening and overlaying the shoe uppers at the area where said fastener strap passes through said opening, the portion of the shoe uppers adjacent the variable instep opening providing a cushion between said closure assembly and the wearer's instep;*

*whereby this construction permits the adjustment and fastening of said closure assembly to a precise desired tautness and secures the shoe by the coaction of said first and second fastening members.*

*30. The shoe of claim 29 wherein the fixed portions of said fastener strap and said anchor strap are attached to the shoe uppers.*

*31. The shoe of claim 30 wherein the fixed portion of the fastener strap is attached to the shoe upper adjacent to the sole of the shoe.*

*32. The shoe of claim 30 wherein the second fastening member is positioned on the fastener strap.*

*33. The shoe of claim 30 wherein the fixed portion of the anchor strap is attached to a shoe upper adjacent to the sole of the shoe.*

*34. A shoe having a sole, uppers and a variable instep opening in combination with an adjustable and flexible*

*closure assembly to span and close the variable instep opening, said closure assembly comprising:*

*a flexible, multi-adjustable, separable fastener means having first and second fastening members each including arrays of complementary, coacting flexible gripping elements for securing said closure assembly;*

*a fastener strap having a free end and a fixed portion permanently attached to the shoe and positioned at one side of the variable instep opening, said first fastening member being fixed to said free end of said fastener strap, said second fastening member being in alignment with said fastener strap and being fixed adjacent to said fixed portion of said fastener strap;*

*anchor means permanently attaching a D-ring to the shoe and positioning said D-ring at the opposite side of the variable instep opening, said D-ring providing an opening above the shoe upper through which said free end of said fastener strap is adapted to pass to adjust and close the variable instep opening; and*

*said closure assembly spanning the variable instep opening and overlaying the shoe uppers at the area where said fastener strap passes through said opening, the portion of the shoe uppers adjacent the variable instep opening providing a cushion between said closure assembly and the wearer's instep;*

*whereby this construction permits the adjustment and fastening of said closure assembly to a precise desired tautness and secures the shoe by the coaction of said first and second fastening members.*

*35. The shoe of claim 34 wherein the D-ring is pivotably attached to the shoe so that the pivotal movement of the D-ring is independent of the movement of the shoe uppers.*

*36. The shoe of claim 35 wherein said anchor means comprises an anchor strap having a fixed portion permanently attached to one side of the shoe and a free end at which the pivotable D-ring is connected.*

*37. The shoe of claim 36 wherein said anchor strap is fixed to a shoe upper.*

*38. The shoe of claim 36 wherein said anchor strap is fixed at a point where the sole and uppers join.*

*39. The shoe of claim 36 wherein said D-ring is provided with a roll bar to allow the fastener strap to glide smoothly and easily provide precise adjustment of the closure assembly.*

*40. A shoe having a sole, uppers, a variable instep opening, a plurality of lace eyelets in said uppers and positioned along both sides of the variable instep opening and laces strung through said lace eyelets, said laces and eyelets serving as a first fastening means, in combination with an adjustable and flexible closure assembly to span and close the variable instep opening and provide greater support to the wearer's foot, said closure assembly comprising:*

*a flexible, multi-adjustable, separable fastener means having first and second fastening members each including arrays of complementary, coacting flexible gripping elements for securing said closure assembly;*

*a fastener strap having a free end and a fixed portion permanently attached to the shoe and positioned at one side of the variable instep opening, said first fastening member being fixed to said free end of said fastener strap, said second fastening member being in alignment with said fastener strap and being fixed adjacent to said fixed portion of said fastener strap;*

*an anchor strap having a free end and a fixed portion permanently attached to the shoe and positioned at the opposite side of the variable instep opening, said free end of said anchor strap including an opening through which said free end of said fastener strap passes to adjust and close the variable instep opening; and*

*said fastener strap and said anchor strap combining to span the variable instep opening and overlay at least some of the laces and thereby provide greater supporting fastening means and comfort to the wearer's foot;*

*whereby this construction of said closure assembly serves as a second fastening means, provides considerable fastening support in addition to that provided by the laces and permits the adjustment and fastening of said closure assembly to better retain the precise desired tautness as well as provide greater fastening security for the shoe by the coaction of said first and second fastening members.*

*41. The shoe of claim 40 wherein said closure assembly overlays the shoe uppers at the area where said fastener strap passes through said opening, the portion of the shoe uppers adjacent the variable instep opening providing a cushion between said closure assembly and the wearer's instep.*

*42. The shoe of claim 40 wherein the fastener strap and the anchor strap are positioned to overlay the upper area of the variable instep opening.*

*43. The shoe of claim 40 wherein the fixed portion of said fastener strap is attached to one side of the shoe proximate to the heel area of the shoe where the sole and uppers join and the fixed portion of said anchor strap is attached to the other side of the shoe proximate to the heel area of the shoe where the sole and the uppers join so that the closure assembly overlays the upper instep of the shoe and provides greater support and fastening security at the ankle area of the wearer's foot.*

*44. The shoe of claim 41 wherein said opening in said anchor strap is a D-ring pivotably attached to said free end of said anchor strap.*

*45. A shoe having a sole, uppers, a variable instep opening, a plurality of lace eyelets in said uppers and positioned along both sides of the variable instep opening and laces strung through said lace eyelets, said laces and lace eyelets serving as a first fastening means, in combination with an adjustable and flexible closure assembly to span and close the variable instep opening and provide greater support to the wearer's foot, said closure assembly comprising:*

*a flexible, multi-adjustable, separable fastener means having first and second fastening members each including arrays of complementary, coacting flexible gripping elements for securing said closure assembly;*

*a fastener strap having a free end and a fixed portion permanently attached to one side of the shoe proximate to the heel area of the shoe where the sole and the uppers join and positioned at one side of the variable instep opening, said first fastening member being fixed to said free end of said fastener strap, said second fastening member being in alignment with said fastener strap and being fixed adjacent to said fixed portion of said fastener strap;*

*an anchor strap having a free end and a fixed end permanently attached to the opposite side of the shoe proximate to the heel area of the shoe where the sole and uppers join and positioned at the opposite side of the variable instep opening, said free end of said anchor strap including an opening through which said free end of said fastener strap passes to adjust and close the variable instep opening;*

*said fastener strap and said anchor strap combining to span the variable instep opening and overlay at least some of the laces at the upper portion of the variable*

*instep opening to provide greater support and fastening security at the ankle area of the wearer's foot;*

*whereby this construction of said closure assembly serves as a second fastening means, provides considerable fastening support in addition to that provided by the laces, permits the adjustment and fastening of said closure assembly to better retain the precise desired tautness as well as provide greater fastening security for the shoe by the coaction of said first and second fastener members.*

*46. The shoe of claim 45 wherein said closure assembly spans and overlays the uppers at the area where said fastener strap passes through said opening, the portion of the shoe uppers adjacent the variable instep opening providing a cushion between said closure assembly and the wearer's instep.*

*47. The shoe of claim 45 wherein said opening in said anchor strap is a D-ring pivotably attached to said free end of said anchor strap.*

*48. A shoe having a sole, uppers and a variable instep opening in combination with an adjustable and flexible closure assembly to span and close the variable instep opening, said closure assembly comprising:*

*a flexible, multi-adjustable, separable fastener means having first and second fastening members each including arrays of complementary, coacting flexible gripping elements for securing said closure assembly;*

*a non-retractable, bifurcated U-shaped fastener strap for spanning the variable instep opening, said bifurcated U-shaped fastener strap having an integral free end portion and a pair of spaced, elongated leg members permanently attached at their fixed ends to one side of the shoe and positioned at one side of the variable instep opening, said integral free end portion interconnecting the two leg members at their ends opposite to the fixed ends attached to the shoe, said first fastening member being fixed to said integral free end portion of said bifurcated fastener strap, said second fastening member being in alignment with said bifurcated fastener strap and being fixed adjacent to said fixed ends of said leg members;*

*permanent anchor means positioned on the opposite side of said variable instep opening, said anchor means including a pair of openings through which said leg members pass, the integral free end portion of said bifurcated fastener strap preventing the withdrawal of said bifurcated fastener strap from said openings;*

*wherein the bifurcated U-shaped flexible strap spans the variable instep opening and is always retained within said openings in said anchor means and whereby this construction permits simultaneous manipulation of both leg members of the bifurcated strap to adjust and fasten said closure assembly to a precise desired tautness and secure the shoe by the coaction of said first and second fastening members.*

*49. The shoe of claim 48 wherein the closure assembly overlays the shoe uppers at the area where said fastener strap passes through said opening so that the portion of the shoe uppers adjacent the variable instep opening provides a cushion between said closure assembly and the wearer's instep.*

*50. The closure assembly of claim 48 wherein the fixed ends of said leg members are attached to the shoe adjacent the variable instep opening.*

*51. The closure assembly of claim 48 wherein the second fastening member is positioned adjacent the edge of the variable instep opening.*

*52. The closure assembly of claim 48 wherein the anchor means comprises a pair of anchor straps, each having a free end and a fixed end permanently attached to the shoe, said pair of openings being formed in said free ends of said anchor straps.*

*53. The closure assembly of claim 52 wherein each of said pair of openings in said anchor straps is a D-ring pivotally connected to the respective free end of the respective anchor strap.*

*54. The closure assembly of claim 48 wherein said openings are formed in the shoe uppers proximate to the variable instep opening.*

*55. The closure assembly of claim 54 wherein each of said openings is formed of a grommet.*

*56. A shoe having a sole, uppers and a variable instep opening in combination with an adjustable and flexible closure assembly to span and close the variable instep opening, said closure assembly comprising:*

*a flexible, multi-adjustable, separable fastener means having a first and second fastening members each including arrays of complementary, coacting flexible gripping elements for securing said closure assembly;*

*a non-retractable, bifurcated U-shaped fastener strap for spanning the variable instep opening, said bifurcated U-shaped fastener strap having an integral free end portion and a pair of spaced, elongated leg members permanently attached at their fixed ends to one side of the shoe and positioned at one side of the variable instep opening, said integral free end portion interconnecting the two leg members at their ends opposite to the fixed ends attached to the shoe, said first fastening member being fixed to said integral free end portion of said bifurcated fastener strap, said second fastening member being in alignment with said bifurcated fastener strap and being fixed adjacent to said fixed ends of said leg members;*

*anchor means permanently attaching a pair of D-rings to the shoe and positioning the D-rings at the opposite side of the variable instep opening, said D-rings providing a pair of openings through which said leg members pass, the integral free end portion of said bifurcated fastener strap preventing the withdrawal of the bifurcated fastener strap from said openings;*

*wherein the bifurcated U-shaped flexible strap spans the variable instep opening and is always retained within said openings in the anchor means and whereby this construction permits simultaneous manipulation of both leg members to adjust and fasten said closure assembly to a precise desired tautness and secure the shoe by the coaction of said first and second fastening members.*

*57. The shoe of claim 56 wherein each D-ring is pivotably attached to the shoe so that the pivotable movement of each D-ring is independent of the movement of the shoe uppers.*

*58. The shoe of claim 56 wherein said anchor means comprise a pair of anchor straps each having a free end and a fixed end permanently attached to the shoe and wherein said D-rings are pivotably connected to the respective free ends of said anchor straps.*

*59. A shoe having a sole, uppers and a variable instep opening in combination with an adjustable and flexible closure assembly to span and close the variable instep opening, said closure assembly comprising:*

*a flexible, multi-adjustable, separable fastener means having first and second fastening members each including arrays of complementary, coacting flexible gripping elements for securing said closure assembly;*

*a non-retractable, bifurcated U-shaped fastener strap for spanning the variable instep opening, said bifurcated U-shaped fastener strap having an integral free end portion and a pair of spaced, elongated leg members permanently attached at their fixed ends to one side of the shoe and positioned at one side of said variable instep opening, said integral free end portion interconnecting the two leg members at their ends opposite to the fixed ends attached to the shoe, said first fastening member being fixed to said integral free end portion of said bifurcated fastener strap, said second fastening member being in alignment with said bifurcated fastener strap and being fixed adjacent to said fixed ends of said leg members;*

*a pair of openings formed in the upper of the shoe on the opposite side of said variable instep opening, said leg members passing under a portion of said upper and through said openings, the integral free end portion of said fastener strap preventing the withdrawal of the bifurcated fastener strap from said openings;*

*wherein the bifurcated U-shaped flexible strap spans the variable instep opening and is always retained within said openings in the upper and whereby this construction permits simultaneous manipulation of both leg members of the bifurcated strap to adjust and fasten said closure assembly to a precise desired tautness and secure the shoe by the coaction of said first and second fastening members.*

*60. The shoe of claim 59 wherein each of said openings is formed of a grommet.*

* * * * *